United States Patent [19]
Foulard

[11] Patent Number: 5,324,343
[45] Date of Patent: Jun. 28, 1994

[54] PROCESS FOR THE RECOVERY OF METALLIC SCRAP

[75] Inventor: Jean Foulard, Ablon, France

[73] Assignee: L'Air Liquide, Societe Anonyme pour l'Etude et l'Exploitation des Procedes Georges Claude, Paris, France

[21] Appl. No.: 41,037

[22] Filed: Mar. 31, 1993

[30] Foreign Application Priority Data

Apr. 7, 1992 [FR] France ................. 92 04237

[51] Int. Cl.⁵ .............................. C22B 11/00
[52] U.S. Cl. ...................................... 75/571
[58] Field of Search ........................... 75/571

[56] References Cited

U.S. PATENT DOCUMENTS

1,739,278 12/1929 Baily ............................. 75/571
3,317,309 5/1967 Rinesch ......................... 75/571
4,612,041 9/1986 Matsuoka et al. ............ 75/10.14

FOREIGN PATENT DOCUMENTS

2666592 3/1992 France.

*Primary Examiner*—Peter D. Rosenberg
*Attorney, Agent, or Firm*—Young & Thompson

[57] ABSTRACT

Process for the recovery of galvanized steel sheet, by remelting with substantial elimination of zinc coating, in which the remelting operation is effected in a rotating furnace (1) under the heating action of at least one flame of fuel and an oxidizing agent which is industrial oxygen. The flame is oxidizing. The furnace is provided with at least one burner (2) for the fuel and industrial oxygen, and a dust catching device (8) in the fume conduit (7) adapted to retain at least a substantial portion of the particles of zinc oxide thus produced. The burner (2) is disposed centrally in an axial end wall (3) of the furnace opposite the fume conduit (7) and the furnace (1) turns in operation about a horizontal axis.

6 Claims, 1 Drawing Sheet

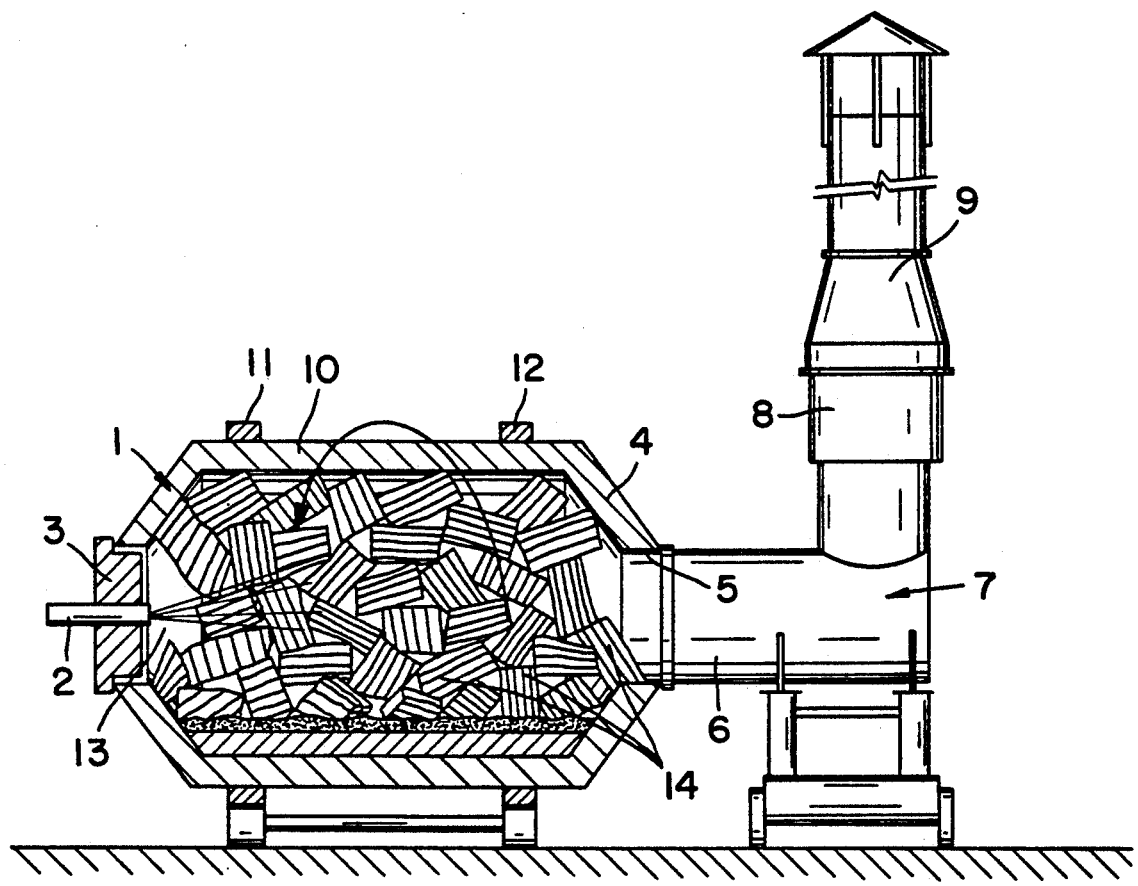

PROCESS FOR THE RECOVERY OF METALLIC SCRAP

Field of the Invention

The invention relates to the recovery of metallic scrap, particularly steel, with a zinc coating especially galvanized sheet.

BACKGROUND OF THE INVENTION

Generally, this recovery is effected by remelting the metallic scrap with the substantial elimination of the surface zinc by smelting the metallic scrap in a blast furnace or in an electric arc furnace. However, such smelting cannot be done except in very limited quantity and is far from being able to handle the existing stocks of such metallic scrap, which are sharply increasing, especially as sheet steel is used which is galvanized on one or both surfaces for the production of automotive vehicles. Given this impossibility of treating such quantities of galvanized sheet in a blast furnace or electric arc furnace, it has been studied whether it would be possible to use conventional foundry techniques, namely a cupola or an induction furnace.

As to a cupola, it has been determined that the latter even though operated with hot air can hardly receive a charge consisting of more than 25% of galvanized sheet steel. Beyond that, there is an instability of operation of the apparatus and a problem of adaptation of the filtration means ordinarily provided for the cupolas for treatment of fumes loaded with zinc vapor. As to induction furnaces, experience has shown an impregnation of the refractory of the crucible by zinc vapors which condense thereon and thus lead to short circuits of the windings of the inductors and, moreover, a certain quantity of zinc dissolves in the melt which even if it does not lead to a deterioration of the metallic properties of the melt, provokes substantial and very serious pollution of the workplace of the foundry during transfer of the melt in a ladle, in the course of which zinc vapors escape which are particularly injurious to the health of personnel in the vicinity.

SUMMARY OF THE INVENTION

The invention has for its object to recover such galvanized metal scrap in a simple and efficacious manner, by remelting with substantial elimination of the zinc vapors that result, and this object of the invention is achieved in that the remelting operation is effected under the thermal action of at least one flame of combustibles such as natural gas, fuel, etc . . . and of an oxidizer constituted by industrial oxygen, preferably in a melting furnace of the rotating type.

It will be noted that the process permits treating in such furnaces very large quantities of galvanized metallic scrap, up to 100%, without any of the drawbacks which would be due to zinc vapors and this particularly surprising result is because the zinc vapors in contact with an oxy-combustible flame are largely transformed into zinc oxides of a particular type which are very easily collected in purifiers at the outlet of the furnace, the flow of fumes from a rotating furnace being substantially lower than that from a cupola, whereby the capture of the residual zinc particles and/or vapors is greatly facilitated. The rotating furnace with an air-combustible or oxy-combustible burner has been used until now as a substitute for the cupola for remelting scrap iron and pig iron. However, despite its undeniable advantages, particularly as to capital cost, it has never been supposed that a rotatable furnace could be used for remelting of galvanized steel sheet, as is amply demonstrated by the fact that such rotating furnaces with a burner have existed for many years and that an unprecedented backlog of galvanized steel sheet has accumulated in this same period, without any proposal having been made to date in the direction of the solution according to the present invention. No doubt the less satisfying attempts for remelting large quantities of such galvanized metallic scrap in conventional remelting installations of the cupola or induction furnace type have dissuaded those engaged in this field from conceiving that a rotating furnace with an oxy-combustible burner could be used. It should be noted as to this that it is important what kind of a rotating furnace with burner is used and that for example a furnace with a burner using air as the combustible would certainly not be satisfactory, because it would produce, because of the large nitrogen dilution, a flow of fumes much too great to permit the capture of the particles of zinc. On the contrary, in the process according to the invention, in which the oxidizer is industrial oxygen, there is reduced to the minimum the flow of fumes from the furnace, such that the operation of capturing the particles and residual vapor of zinc becomes economically possible.

The invention also contemplates an installation for melting metallic scrap, particularly steel clad with zinc, particularly galvanized steel sheet, which is characterized by a melting furnace of the rotating type, provided with a burner for a combustible constituted by industrial oxygen and a particle catcher disposed in the exhaust conduit and adapted to retain at least a substantial part of the zinc oxide particles.

BRIEF DESCRIPTION OF THE DRAWING

The invention will now be described with reference to the accompanying drawing, which is a schematic view of an installation according to the invention.

DETAILED DESCRIPTION OF THE INVENTION

In this installation, a rotating furnace 1 has a generally cylindrical body 10 with a horizontal axis, driven in rotation about its axis on bearings 11 and 12. The furnace 1, for example as described in the document FR-A-2.666.816, comprises a metal shell and an internal lining of refractory material and comprises at one axial end a rear wall 3 supporting centrally an oxy-combustible burner 2, and, at the opposite axial end 4, a wide orifice or central flue 5 opening, in the normal operating configuration, into a fume conduit 7 comprising a horizontal section 6 aligned with the axis of the furnace 1 and a vertical section 9 incorporating an appropriate particle capturing device 8, comprising for example a cyclone and at least one dust filter.

In operation, a charge entirely constituted by the bundles of galvanized steel sheet 14 is introduced into the preheated empty furnace through the flue 5. The furnace 1 is then placed in rotation about its axis at the same time that the burner 2 is actuated with an oxy-combustible mixture and emits a broad oxidizing flame 13. The heat transfer toward the charge is effectuated both by radiation and convection, as well as by conduction because of the passages of the internal wall of the furnace heated by the flame in direct contact with the charge at the rear of the furnace. The flame thus effects first a melting of the zinc at a temperature of about 530° C., then a vaporization thereof at 900° C. The emitted zinc vapors are thus bathed in the flame 13 of the burner 2, which has, according to one aspect of the invention, a rather pronounced oxidizing character, because of the presence of an excess of substantially pure oxygen, sufficient to oxidize a substantial portion of the zinc vapor separated from the steel substrates, which is thus transformed into particles of zinc oxide $ZnO_2$ and a small proportion (less than 5%) of $ZnO$, entrained by the fumes and easily captured, as well as particles of $Fe_2O_3$ formed in small proportions, in the dust catching device 8. The installation, and particularly the suction means in the fume conduit, are preferably adjusted so as to create, in the operating furnace, a very slight vacuum avoiding emission of the particles of zinc oxide in the work place of the furnace.

There is thus obtained, for an initial charge of galvanized steel sheet of 1500 kg, about 1400 kg of reusable steel in the foundry with a zinc content less than 0.007%. The zinc in the recovered dust can moreover be recovered. It will be understood that there is negligible contamination by non-oxidized zinc of the refractory lining of the rotating furnace.

What is claimed is:

1. A method of retreating galvanized steel sheets comprising:
   providing a rotary furnace having a fume conduit and at least one oxy-fuel burner;
   charging the furnace with a load of galvanized steel sheets;
   operating the burner to generate an oxidizing flame to cause the steel to melt and the galvanizing zinc to melt and vaporize into zinc oxide particles;
   recovering molten steel for further treatment.

2. The method of claim 1, wherein the burner is operated with an excess ratio of oxygen.

3. The method of claim 2, wherein the recovered molten steel contains less than 0.007% of zinc.

4. The method of claim 1, further comprising recovering the zinc oxide particles captured in the fume conduit.

5. The method of claim 1, comprising the step of rotating the furnace around a horizontal axis.

6. The method of claim 5, comprising generating the flame at one axial end of the furnace opposite the fume conduit.

* * * * *